(12) United States Patent
Studebaker, Jr.

(10) Patent No.: US 10,219,438 B1
(45) Date of Patent: Mar. 5, 2019

(54) APPARATUS, SYSTEM AND METHOD FOR TRANSPORTING BALES

(71) Applicant: Robert L. Studebaker, Jr., Tulsa, OK (US)

(72) Inventor: Robert L. Studebaker, Jr., Tulsa, OK (US)

( * ) Notice: Subject to any disclaimer, the term of this patent is extended or adjusted under 35 U.S.C. 154(b) by 39 days.

(21) Appl. No.: 15/170,579

(22) Filed: Jun. 1, 2016

Related U.S. Application Data

(60) Provisional application No. 62/169,761, filed on Jun. 2, 2015.

(51) Int. Cl.
  *A01D 90/00* (2006.01)
  *A01D 90/08* (2006.01)
  *B65G 67/02* (2006.01)
  *B60P 3/00* (2006.01)

(52) U.S. Cl.
  CPC .............. *A01D 90/083* (2013.01); *B60P 3/00* (2013.01); *B65G 67/02* (2013.01)

(58) Field of Classification Search
  CPC ...... A01D 90/083; A01D 90/12; A01D 90/02; B60P 3/00; B65G 67/02
  USPC ................................ 414/24.5, 24.6, 25, 111
  See application file for complete search history.

(56) References Cited

U.S. PATENT DOCUMENTS

| | | | | |
|---|---|---|---|---|
| 2,862,635 A | * | 12/1958 | Christenson | B60G 5/053 414/459 |
| 4,072,241 A | * | 2/1978 | Parker | A01D 90/083 294/107 |
| 4,076,137 A | * | 2/1978 | Kucera | A01D 90/083 414/24.5 |
| 4,171,927 A | * | 10/1979 | Aoyama | B60P 1/38 414/460 |
| 4,227,844 A | * | 10/1980 | Love | A01D 90/083 280/473 |
| 4,248,561 A | * | 2/1981 | Graves | A01D 90/083 198/518 |
| 7,210,888 B2 | * | 5/2007 | Bearden | A01D 87/126 172/439 |
| 2004/0037673 A1 | * | 2/2004 | Eastwood | A01D 90/083 414/24.5 |
| 2011/0311338 A1 | * | 12/2011 | Patrick | A01D 90/083 414/24.5 |

* cited by examiner

*Primary Examiner* — Lynn E Schwenning
(74) *Attorney, Agent, or Firm* — Frederic Dorwart, Lawyers PLLC; Penina Michlin Chiu

(57) ABSTRACT

An apparatus, system and method for transporting bales is described. A system for transporting bales includes a hauling truck, a trailer pivotably coupled to the hauling truck by a gooseneck, the trailer comprising telescoping arches, wherein the telescoping arches move a cradle between a loading position, wherein tubular elongate skids slide into a space between a round bale and a ground in the loading position, and a transport position, wherein an angled portion of the tubular elongate skids lift the bale off the ground in the transport position, and wherein the gooseneck pivots the trailer to a driver's side of the hauling truck in the loading position, and wherein the hauling truck loads the bale while moving forward.

8 Claims, 8 Drawing Sheets

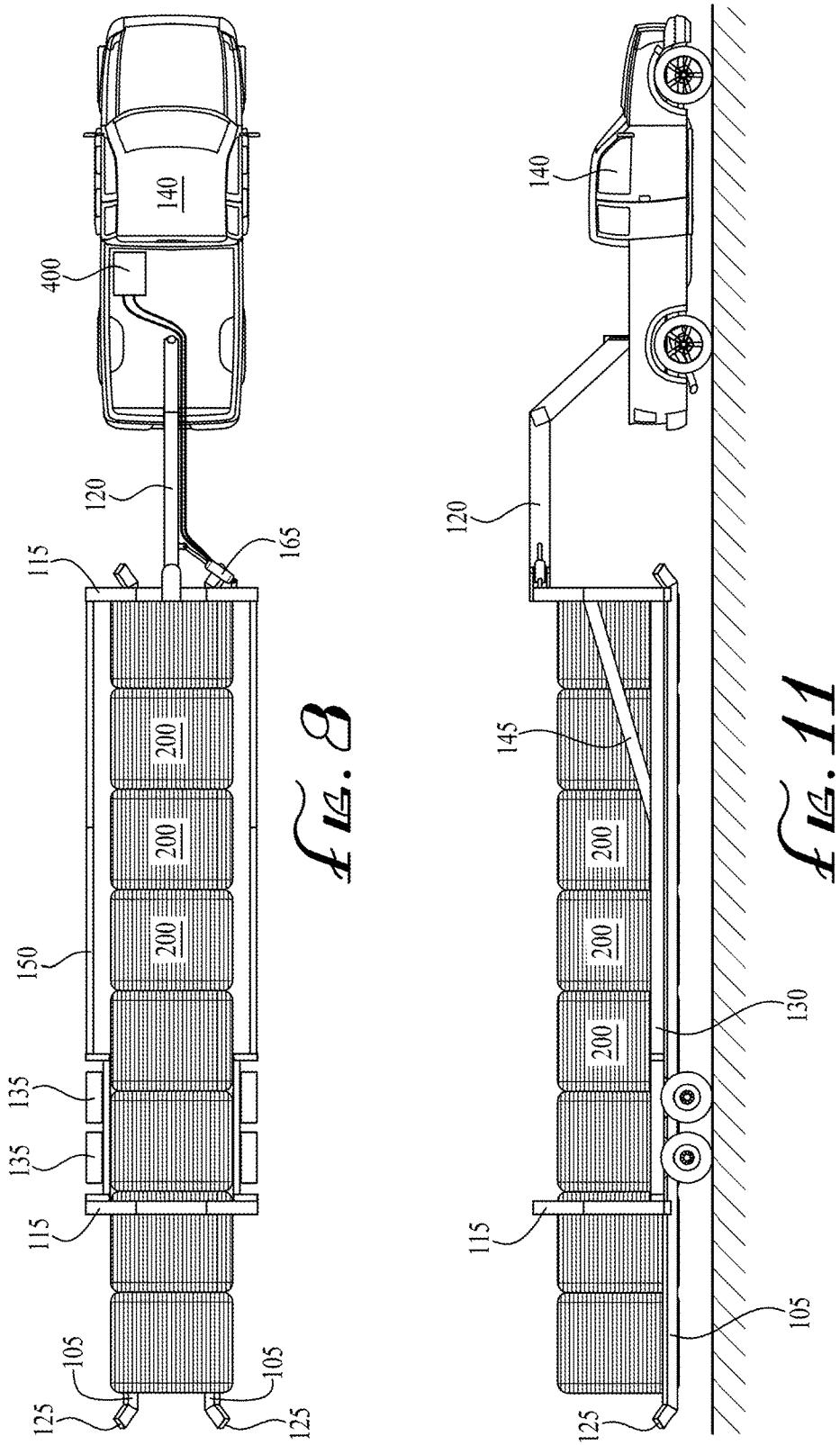

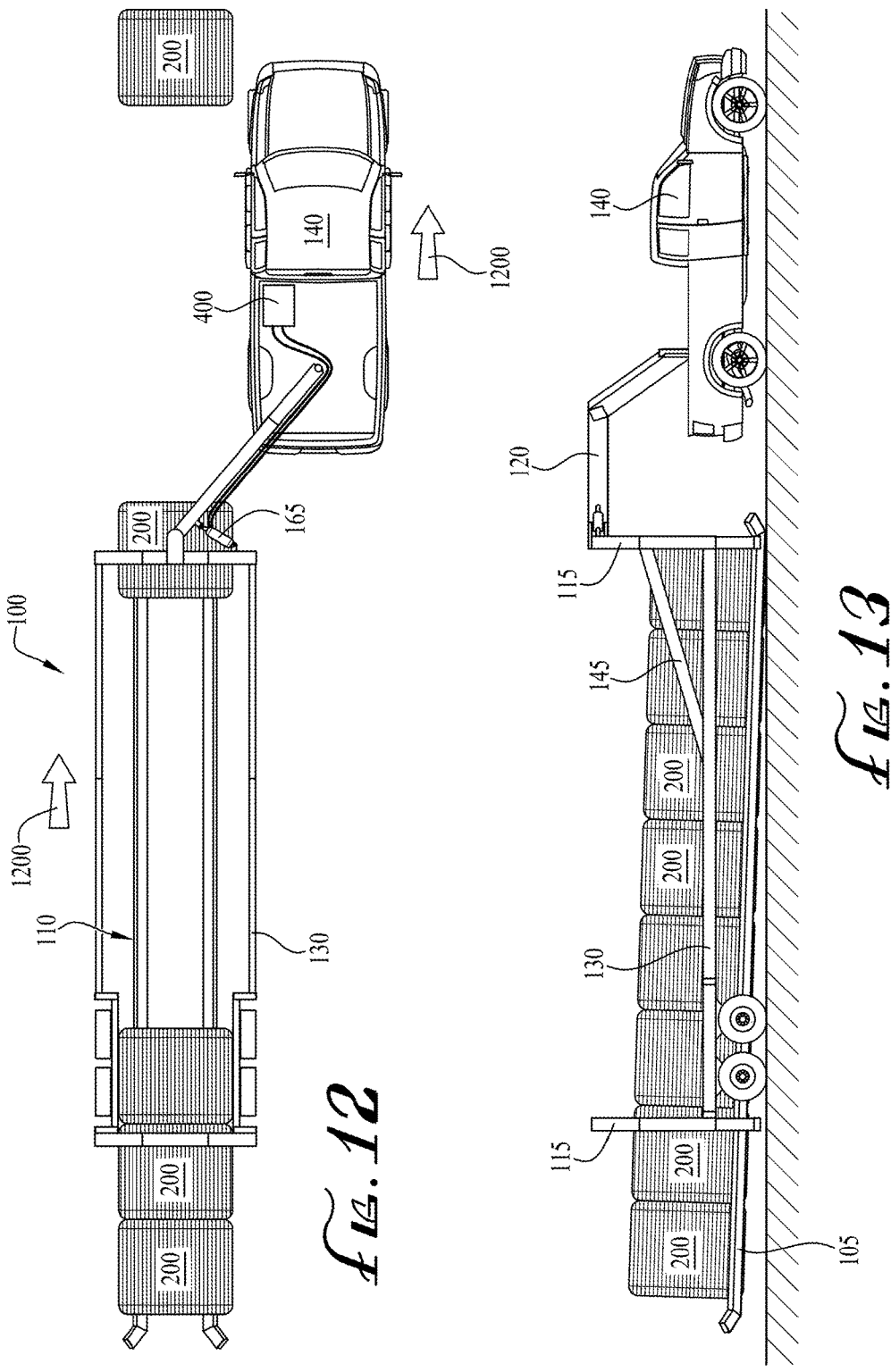

APPARATUS, SYSTEM AND METHOD FOR TRANSPORTING BALES

CROSS REFERENCE TO RELATED APPLICATIONS

This application claims the benefit of U.S. Provisional Application No. 62/169,761 to Studebaker, filed Jun. 2, 2015 and entitled "APPARATUS, SYSTEM AND METHOD FOR TRANSPORTING BALES," which is hereby incorporated by reference in its entirety.

BACKGROUND OF THE INVENTION

1. Field of the Invention

Embodiments of the invention described herein pertain to the field of equipment for transporting bales. More particularly, but not by way of limitation, one or more embodiments of the invention enable an apparatus, system and method for transporting bales.

2. Description of the Related Art

Bales are tightly wrapped bundles of hay, cotton, paper or other similar materials. Hay bales, for example, are typically between five and six feet in diameter, weighing on average 1,000 pounds per bale. These hay bales are cylindrical in shape, but are often referred to as "round" in the industry in order to differentiate the "round" bales from their rectangular predecessors. Because these hay bales are large and heavy, they are difficult to move. Ranchers in particular often desire to move large bales of hay to feed their cattle.

Trailers for moving hay bales conventionally require tractors for either loading the trailer, towing the trailer, or both. One type of conventional trailer requires a tractor for loading hay bales on the trailer. With these tractor-loaded trailers, the trailer sits stationary in the field while a tractor equipped with a front-loader and hay spikes picks up one bale at a time, and loads the bales onto the trailer, one at a time. Another type of conventional trailer requires a tractor for towing the trailer using three-point hook-ups. Using tractors to load and/or tow hay trailers is an inefficient use of the tractor, since tractors move slowly, on average about 12-15 miles per hour. In addition, tractors also often need to be employed in mowing, raking and baling hay and cannot be used to do so if the tractor is tied up loading or towing hay bales. If bales need to be hauled over long distances, using a tractor to pull the hay trailer wastes fuel and man hours, as slow and tedious trips are made with the tractor.

One approach to reduce tractor time in loading hay bales has been to implement "self-loading" trailers, which although sometimes referred to as "self-loading" are typically loaded with tractor assistance. The hay trailers are loaded backwards, as the driver of the tractor moves the tractor in reverse. The driver must look behind him, whilst using the tractor to lower the entire trailer, load the hay by sliding the trailer under the bales during the reverse drive, and then re-lift the trailer. In this process, the tractor picks up the bales by lifting the entire trailer. However, reverse loading is by nature a slow process. In additional, lifting and lowering the entire trailer is inefficient for a variety of reasons. First, because the trailers require so many moving parts in order to move the whole trailer, there is a high risk that the trailer will break down. These conventional trailers are also difficult to operate since an entire trailer must be moved. Further, large hydraulics which use large quantities of energy must be employed in order to lift the entire trailer.

Conventional hay trailers also suffer from other drawbacks. Conventional multi-bale hay trailers may carry between five and ten bales at a time and operate by the load only. The entire load must be unloaded at the same time. However, most ranchers have multiple pastures, sometimes located miles apart. Only a finite number of bales, depending on the number of cows, are needed at a specific pasture at any given time. Too much hay delivered to a pasture at once will cause hay to be wasted.

Another problem associated with conventional hay trailers is "bad side" hay waste. As hay is baled, it typically sits in the hay field for several days or even weeks until the rancher has the time or equipment available to move it to the hay storage lot. The hay must be moved at some point, however, to allow the next growth of hay to produce and be baled. During the period that the hay bales sit in the hay field, prior to transport to the hay lot, the side touching the ground absorbs moisture and the very bottom may even pick up some soil. This absorbed moisture is conducive to mold. The longer the bale sits before it is moved to a surface that is prepared for storage, the greater percentage of the bale will become inedible and wasted. This waste is unavoidable unless the rancher has the equipment to move it immediately after baling. Conventionally, immediate movement is not possible because the tractor that would be required to load the hay onto a conventional hay trailer is being used in a more critical operation such as baling, so a portion of the bale rots.

If the development of a "bad side" to a bale is unavoidable, then creating two bad sides on the same bale is twice as bad. Conventional hay trailers "dump" the hay as it unloads, causing the bales to roll. For this reason, the bales seldom end up sitting on the original bad side once they are moved. As a result, a second bad side is created as the bale sits prior to feeding. This new bad side will develop even in the best prepared storage lots that are not covered. Hay storage barns cost hundreds of thousands of dollars so bales are typically stored outside. Prudent ranchers try to minimize the effect of bale rot by using gravel to raise and drain the surface where the bales will rest until feeding, but this approach only meets with limited success.

"Bad side" hay waste can be significant in magnitude, and is conventionally considered by most ranchers as an unavoidable expense. If a rancher has three-hundred head of cattle, he will need approximately three bales per head to make it through the winter, putting up an estimated one-thousand bales. If 10% of those bales are wasted and the bales average 1000 lbs. each, that equates to 100,000 lbs. of hay wasted. At the current price of $40 per bale, that is $4,000 or 100 bales of waste.

Thus, for at least the reasons described above, conventional bale trailers suffer from many shortcomings and there is a need for an improved apparatus, system and method for transporting bales.

BRIEF SUMMARY OF THE INVENTION

An apparatus, system and method for transporting bales is described. A bale trailer of an illustrative embodiment includes a gooseneck that pivotably couples to a hauling member, wherein the gooseneck pivots between a first gooseneck position askew of the hauling member and a second gooseneck position behind the hauling member, a pair of arches, wherein each arch of the pair of arches comprises at least two telescoping support members, wherein a first arch of the pair of arches is secured to the gooseneck, and a second arch of the pair of arches is secured proximate rear wheels, and a moveable cradle coupled to a bottom side of the at least two telescoping support members of the pair of telescoping arches, the moveable cradle comprising at least two tubular elongate skids, wherein a first of the at least two tubular elongate skids is parallel to a second of the at least two tubular elongage skids, each of the at least two tubular elongate skids angled with respect to a ground such that the at least two tubular elongate skids support a rounded bale. In some embodiments, a first hydraulic cylinder operatively coupled to the gooseneck pivots the gooseneck and a second hydraulic cylinder operatively coupled to the pair of telescoping arches telescopes the support members. In certain embodiments, the at least two tubular elongate skids further comprise a flare configured to center the rounded bale in the cradle.

An illustrative embodiment of a system for transporting bales includes a hauling truck, a trailer pivotably coupled to the hauling truck by a gooseneck, the trailer comprising telescoping arches, wherein the telescoping arches move a cradle between a loading position, wherein tubular elongate skids slide into a space between a round bale and a ground in the loading position, and a transport position, wherein an angled portion of the tubular elongate skids lift the bale off the ground in the transport position, and wherein the gooseneck pivots the trailer to a driver's side of the hauling truck in the loading position, and wherein the hauling truck loads the bale while moving forward. In some embodiments, the movement of the cradle and the pivoting of the gooseneck is controlled by a driver of the hauling truck with a remote control. In certain embodiments, the hydraulic cylinders move the cradle and the gooseneck in response to the remote control. In certain embodiments, there are a plurality of loading positions defined by extending a first telescoping arch of the telescoping arches to a first length and a second telescoping arch of the telescoping arches to a second length.

An illustrative embodiment of a method for partially unloading a bale trailer includes transporting a plurality of bales to a delivery location on a bale trailer comprising a cradle, wherein the cradle is moveably attached to a front support arch and a back support arch, and wherein the front and back support arches telescope, telescoping the front and back support arches at the delivery location such that the back support arch is extended more than the front arch and the cradle is angled downwards as judged from the front support arch such that a first at least one bale of the plurality of bales to be delivered at the delivery location contact a ground, and a second at least one bale of the plurality of bales to be further transported do not contact the ground, moving the bale trailer forward until the first at least one bale of the plurality of bales contacting the ground are clear of the cradle and proceeding to a second delivery location with the second at least one bale of the plurality of bales to be further transported.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of the invention will be more apparent from the following more particular description thereof, presented in conjunction with the following drawings wherein:

FIG. 7 is a side elevation view of a bale trailer of an illustrative embodiment in a loading position.

FIG. 8 is a top plan view of a bale trailer an illustrative embodiment in a towing position.

FIG. 11 is a side elevation view of a bale trailer of an illustrative embodiment in a towing position.

FIG. 12 is a top plan view of a bale trailer of an illustrative embodiment loading bales while moving forward.

FIG. 13 is a side elevation view of an exemplary bale trailer in a ramped loading position of an illustrative embodiment.

Figure 1:
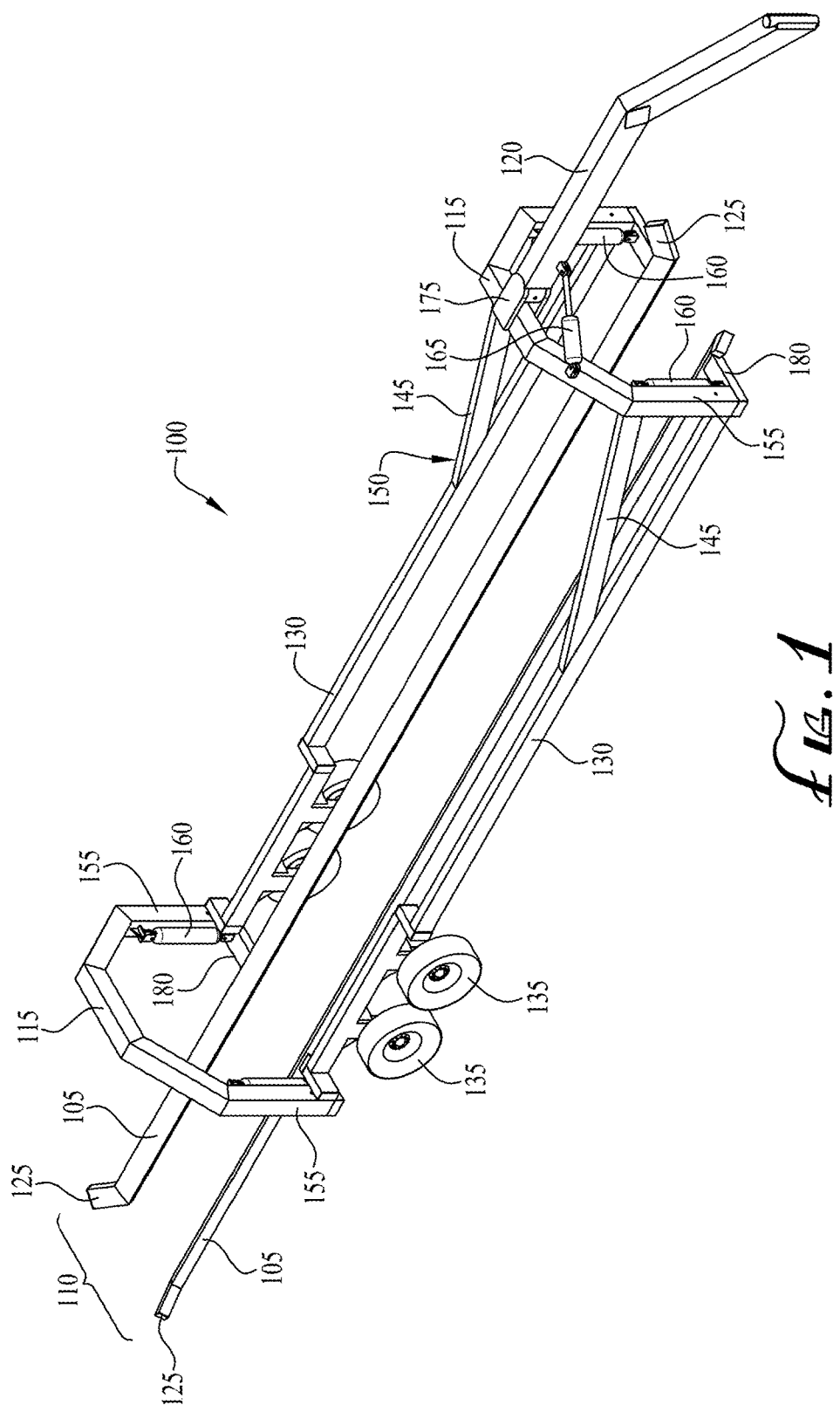
FIG. 1 is a perspective view of a bale trailer of an illustrative embodiment.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

An apparatus, system and method for transporting bales will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a hydraulic cylinder includes one or more hydraulic cylinders.

"Coupled" refers to either a direct connection or an indirect connection (e.g., at least one intervening connection) between one or more objects or components. The phrase "directly attached" means a direct connection between objects or components.

Illustrative embodiments of the invention described herein provide an apparatus, system and method for transporting bales. The bale trailer of illustrative embodiments may only require lifting or lowering of a bale cradle and/or a pair of skids to load or unload, and not the entire trailer as in conventional bale trailers. As a result, the bale trailer of illustrative embodiments may have fewer moving parts with lower risk of breakdowns as compared to conventional trailers that require the entire trailer to be raised and lowered. Illustrative embodiments may be easier and faster to operate than conventional bale trailers since only the cradle of the trailer moves to load and unload the trailer and/or move the trailer into a transport position. A smaller hydraulic system that is less expensive and requires less hydraulic oil by volume may be employed to allow illustrative embodiments to operate less expensively and more quickly than conventional trailers that must move the entire trailer to load or unload. By raising and lowering only a pair of skids and/or only the cradle, and not the entire trailer, the hydraulic system may be relieved of lifting an additional 5,000 to 6,000 pounds. Thus, less hydraulic power may be required.

Illustrative embodiments may be both loaded and hauled by a truck rather than a tractor, saving time and freeing a tractor to be used for other tasks. Illustrative embodiments may be loaded and/or unloaded while moving forward. In addition to having the capability of being loaded and/or unloaded moving backwards as in conventional models, as an improved feature the bale trailer of illustrative embodiments may be loaded and/or unloaded while moving forward. In additional illustrative embodiments may provide for an operator to unload partial loads by allowing an operator to select the precise number of bales to be unloaded, which unloaded bales may be only a fraction of bales then-loaded on the trailer. Illustrative embodiments may further minimize bad side hay waste by permitting bales to be loaded and unloaded with the same side of the bale always facing the ground.

While for illustration purposes, illustrative embodiments are described herein in terms of a hay bale trailer, nothing herein is intended to limit the invention to those embodiments. Other types of bales may be transported using the bale trailer of illustrative embodiments, such as a paper, straw, silage or cotton.

Illustrative embodiments provide a bale trailer that is pivotable with respect to a hauling member by a gooseneck. Pivoting the bale trailer of illustrative embodiments may allow the bale trailer to be placed askew of a hauling member, for example cattycornered to the driver's backside of the hauling member, such that the trailer may be loaded by driving forwards. The bale trailer of illustrative embodiments may include a stationary frame and an actuateable cradle. Telescoping arches may lift and lower the front of the cradle, back of the cradle or both, in a continuum of positions. In this manner, the bale trailer of illustrative embodiments may allow partial loads of bales to be unloaded at a selected destination, at the option of the human operator. The bale trailer of illustrative embodiments may be actuated and/or pivoted by remote control through the use of a hydraulic system.

FIG. 1 illustrates a bale trailer of an illustrative embodiment. As shown in FIG. 1, trailer 100 may be a bale trailer for transporting bales, such as hay bales, silage bales or cotton bales. Trailer 100 may accommodate multiple bales, such as five, six, eight, ten or eleven bales simultaneously, which bales may for example be five feet wide and six feet in diameter, per bale. Trailer 100 may be constructed of steel pipes, tubing, planks and/or bars which may for example be square, rectangular or rounded. Trailer 100 may include trailer frame 150, cradle 110, arches 115 and gooseneck 120. Trailer frame 150 may be the skeleton of trailer 100. Cradle 110 may hold bales when trailer 100 is loaded and/or may be the actuatable portion of trailer 100. Arches 115 may be telescoping arches that support and actuate cradle 110. Gooseneck 120 may pivot trailer 100 and secure trailer 100 to hauling member 140 (shown in FIG. 2) such as a truck or tractor. While hauling member 140 may be a tractor, illustrative embodiments may allow hauling member 140 to be a truck such as a pickup truck, to be used in both loading and hauling the trailer, freeing a tractor for other purposes and reducing bale 200 (shown in FIG. 2) transport time.

Frame 150 may be the skeletal structure of trailer 100. Frame may include connecting bars 130 that extend longitudinally between arches 115 just above rear wheels 135. When cradle 110 is in a travel position, skids 105 of cradle 110 may be about level with connecting bars 130. Frame 150 may also include slant bars 145 that may extend in an angled fashion between arches 115 and connecting bars 130. Connecting bars 130 and slant bars 145 of frame 150 may remain stationary during movement of cradle 110.

Arches 115 may support and actuate cradle 115, and support gooseneck 120. Arches 115 may include inward extending cross supports 180 to support and/or actuate cradle 115 from underneath skids 105. In some embodiments, at least two arches 115 may be employed. In the embodiment shown in FIG. 1, a first arch 115 is at the front end of cradle 100, with the top of arch 115 attached to gooseneck 120 by hinge 175. A second arch 115 may be placed just rear of and/or proximate wheels 135. In some embodiments, rear arch 115 may act as an axle for rear wheels 135. Arches 115 may include telescoping support members 155. Each telescoping support member 155 may include concentric tubular components that slide into and out of one another to become shorter and longer. Each arch 115 may include two telescoping support members, one telescoping support member 155 of each arch 115 attached, coupled and/or supported at the bottom side to each skid 105 of cradle 110, for example with cross supports 180. As telescoping support members 155 extend, cradle 105 may be lowered towards the ground. As telescoping support members 155 retract, cradle 105 may be lifted away from the ground. In some embodiments, at its highest point, cradle 105 may be about twenty inches off the ground.

Telescoping support members 155 of arches 115 may be actuated to extend and retract with actuating members 160. Actuating members 160 may be hydraulic or pneumatic cylinders that extend and retract telescoping support members 155. Hydraulic or pneumatic pressure may be provided by hoses and pressure unit 400. Actuating members 160 may positioned near the bottom of the legs of arches 115, may be on the outside of telescoping support members 155 between the legs and cradle 110 rail and/or in tube embodiments, may be within the tubing that forms arches 115 and/or support members 155. Actuation of telescoping support members 155 may be operated to extend and retract by remote control. Telescoping support members 155 may also be operated independently from one another. For example, in some embodiments, telescoping support members on the front arch 115 may be actuated without actuating telescoping support members 155 on the back arch 115 for example as illustrated in FIG. 13, and vice versa. In this way, only the front, only the back or combination of the front and back of cradle 110 may be lowered or lifted. Actuation of telescoping support members 155 may be in a continuum and/or in increments of set points such that the angle of cradle 110 (the extent to which skids 105 of cradle 110 touch the ground) may be varied based on the relative actuation of telescoping support members 155 on front and back arches 115.

Cradle 110 may include two elongate skids 105. Skids 105 may extend longitudinally (lengthwise) along the length of trailer 100 and be arranged such that a first skid 105 is substantially parallel to a second skid 105, which skids 105 may be rectangular or substantially rectangular in shape. In embodiments for bales five or six feet in diameter, the distance between skids may be about three feet. In one example, cradle 110 may be constructed of two, parallel forty-foot plus pieces of rectangular tubing (skids 105), spaced about three feet apart. Skids 105 may be angled (slanted) such that the inner length of the skids are closer to the ground than the outer length of skids 105. Angling of skids 105 may allow skids 105 to follow the curvature of the round bales and "cradle" the bales as they are lifted, lowered and/or transported. Skids 105 may include flares 125, which may flare outwards at both the front and rear of skids 105 to assist in centering bales between skids 105 as they enter cradle 110. When cradle 110 is in a transport position, skids 105 may sit about even with the height of tires 135 and/or connecting bars 130 (for example, about 20 inches from the ground). Tires 135 may be placed along the length of trailer 100 to allow trailer 100 to travel with hauling member 140 (shown in FIG. 2). Horizontal bars, tubes, pipes or beams, such as cross supports 180, extending between arches 115 and skids 105 may be used to connect skids 105 to telescoping support members 155, and/or skids 105 may be directly connected to arches 115.

Figure 2:
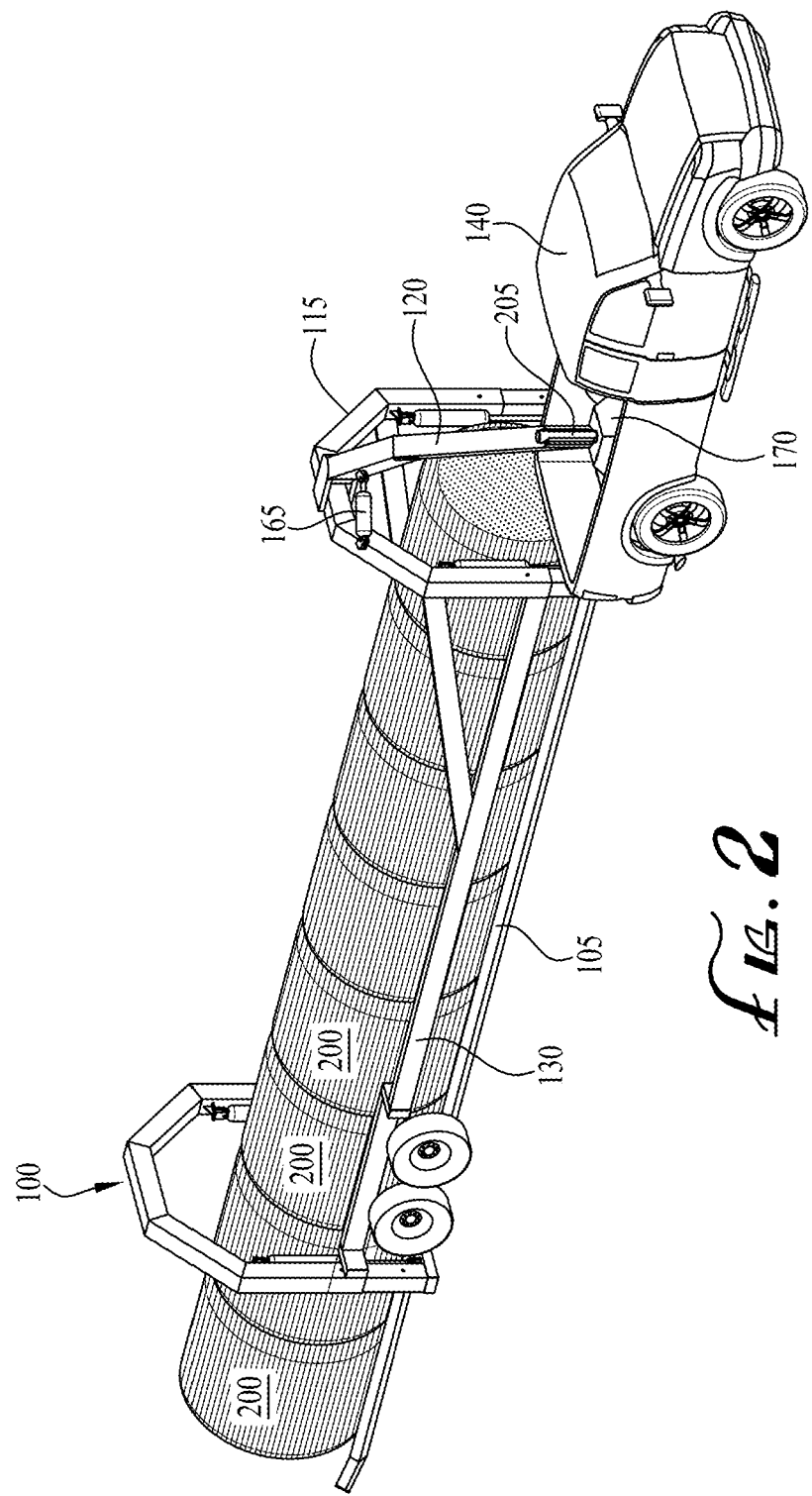
FIG. 2 is a perspective view of a bale trailer of an illustrative embodiment in a loading position.
Figure 4:
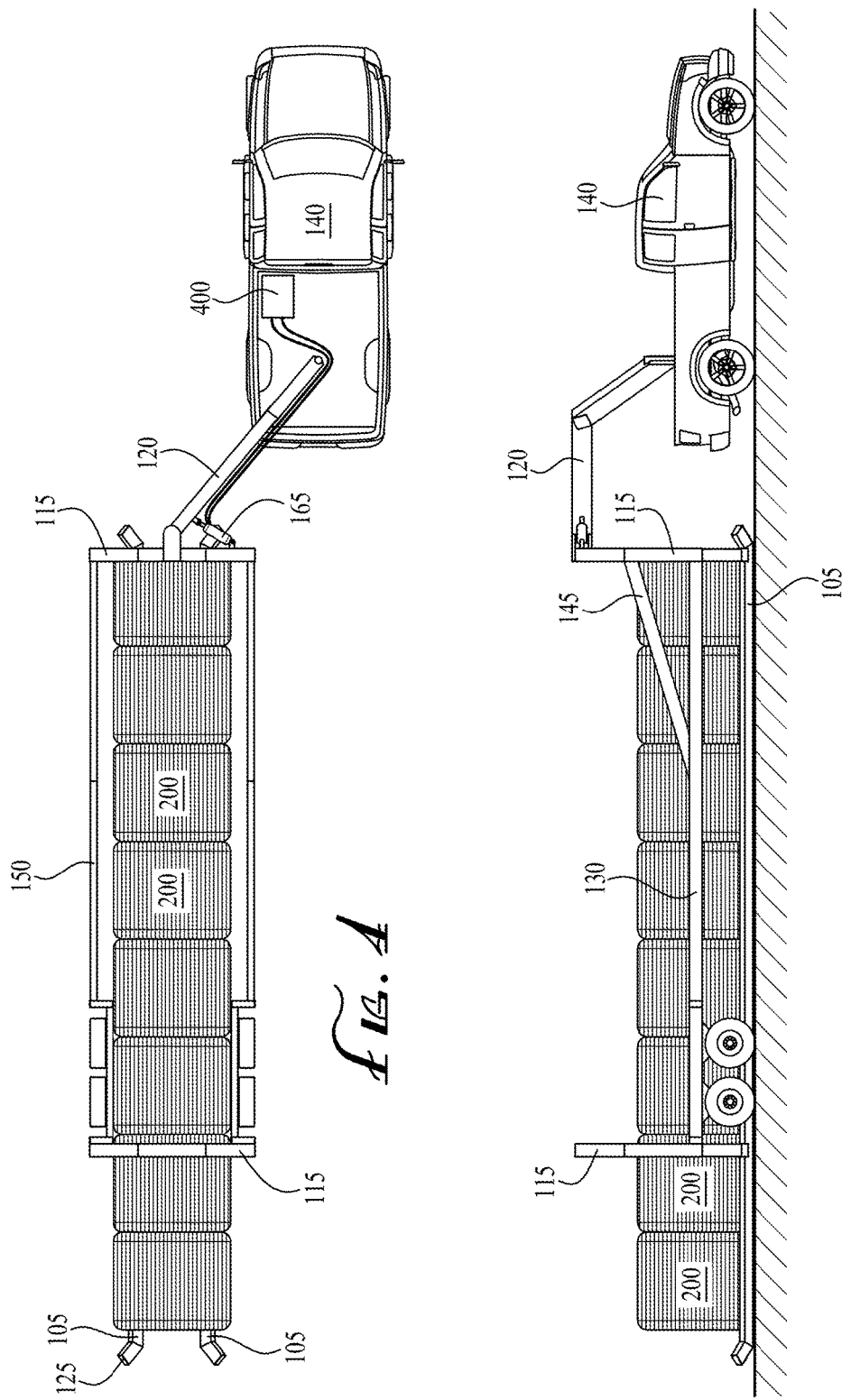
FIG. 4 is a top plan view from above of a bale trailer an illustrative embodiment in a loading position.
Figure 5:
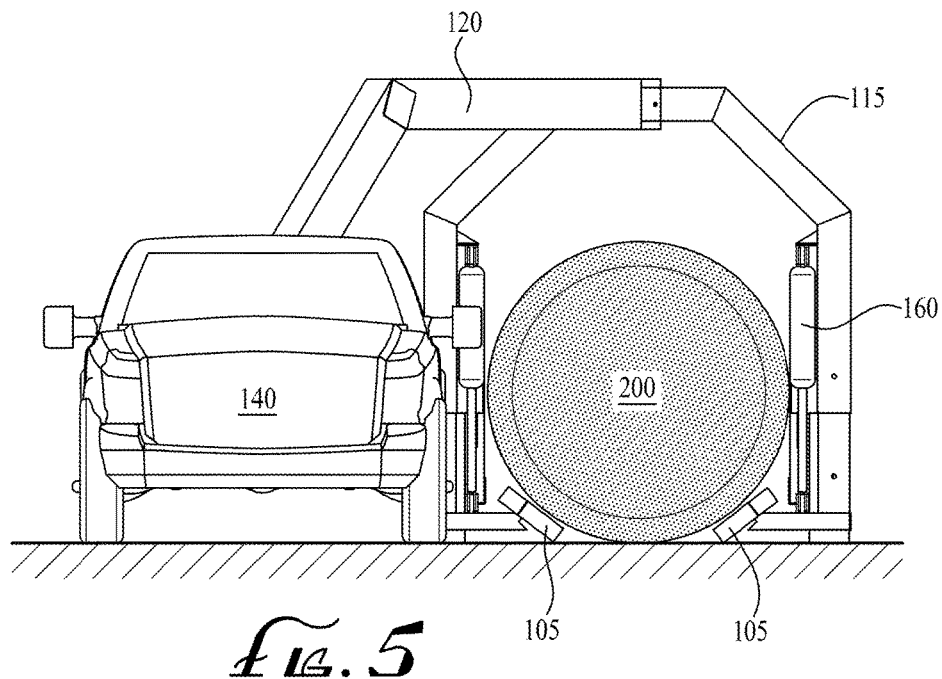
FIG. 5 is a front elevation view of a bale trailer of an illustrative embodiment in a loading position.

Turning to FIG. 2, gooseneck 120 may be attached to the forward most arch 115 on a first end and be connectable to hauling member 140 on a second end. Hinge 175 may hingedly and/or pivotably attach gooseneck to arch 115 and/or frame 150 such that trailer 100 may pivot with respect to hauling member 140. Gooseneck 120 may connect to bed 170 of hauling vehicle 140 with ball and coupler 205, for example a 2⁵⁄₁₆ inch gooseneck ball or other similar type of towing attachment such that gooseneck 120 may pivot with respect to bed 170. Mechanical actuator 165 (shown in FIG. 4) extending between front arch 115 and gooseneck 120 may operate to pivot and/or hinge gooseneck 120 either behind hauling member 140 for towing or to the side, askew and/or cattycorner to hauling member 140 for loading and unloading. In some embodiments, mechanical actuator 165 may be attached to an ear welded on the front arch 115 and/or positioned to permit clearance for hauling vehicle 140 when in the loading position. In some embodiments, when in a loading or unloading position, trailer 100 may be cattycorner to the back, driver's side corner of hauling member 140 as illustrated in FIG. 4. Positioning the front end of trailer 100 on the driver's side for loading and/or unloading may allow the human operator an improved sightline to bales 200 being loaded or unloaded.

Illustrative embodiments provide for trailer 100 to be askew of hauling member 140 during loading and unloading, and directly behind (or about behind) trailer 100 during towing. Placing trailer 100 next to the side of hauling member 140 for loading or unloading, as is best shown in FIG. 4, may allow trailer 100 to be loaded while hauling member 140 is moving forward, rather than driving backwards as in conventional methods. Mechanical actuator 165 may be a hydraulic or pneumatic cylinder that is operated by remote control and/or pressure unit 400, which may be the same pressure unit and/or remote control that operates actuating members 160. Mechanical actuator 165 may be connected to pressure unit 400 by suction and discharge hoses. In some embodiments, when gooseneck 120 is attached to hauling member 140, in order to move trailer 100 behind or askew of hauling member 140, hauling member 140 may drive forward during activation of mechanical actuator 165 such that positioning of trailer 100 with respect to hauling member 140 may be accomplished. Orientation of gooseneck 120, gooseneck 120 essentially taking the place of front wheels of trailer 100, may steer the front of trailer 100 and the rear wheels 135 may follow.

Figure 3:
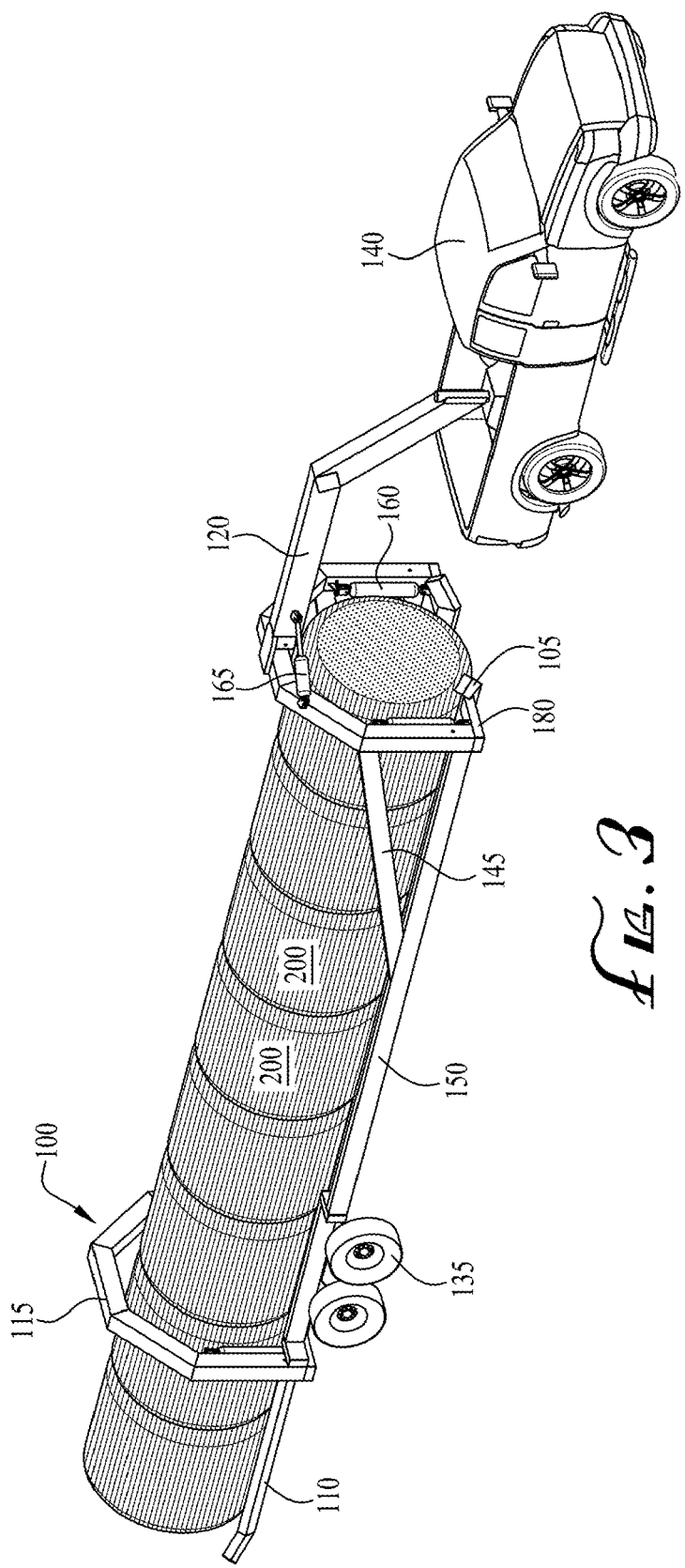
FIG. 3 is a perspective view of a bale trailer of an illustrative embodiment in a towing position.

FIG. 2 shows a bale trailer of an illustrative embodiment in a loading and/or unloading position. As shown in FIG. 2, cradle 110 is in a lowered (loading or unloading) position and trailer 100 is at an angle to (cattycorner and/or behind and to the side of) hauling member 140. FIG. 3 illustrates a bale trailer of an illustrative embodiment in a towing position. As shown in FIG. 3, cradle 110 is in a raised position and trailer 100 is in-line with hauling member 140. In both FIGS. 2 and 3, cradle 110 is loaded with bales 200.

FIGS. 4-7 illustrate additional views of trailer 100 in a loading and/or unloading position. As shown in FIGS. 4-7, since trailer 100 is to the side of and/or next to hauling member 140 during loading or unloading, for example at a 45° angle from the back of hauling member 140, the operator of hauling member 140 may drive behind a row of bales 200, and simply drive forward to collect bales 200 from the ground with lowered cradle 110. Because trailer 100 is placed askew of hauling member 140, hauling member 140 may not impede forward loading since hauling member 140 may be out of the way of bales 200. FIG. 12 shows an illustrative embodiment of forward loading of trailer 100. As shown in FIG. 12, trailer 100 is to the rear, driver's side of hauling member 140. Three bales 200 are shown to the rear of trailer 100 and have already been loaded onto cradle 110. Arrows 1200 illustrate the forward movement of hauling member 140 and trailer 100. Trailer 100 has just reached a fourth bale 200 actively being loaded onto cradle 110. Skids 105 of cradle 110 may scoop up bale 200 from underneath. A fifth bale 200 is shown next to hauling member 140, the fifth bale 200 positioned to be loaded as hauling member continues to move forward. Optionally, loading and/or unloading may also be accomplished in a backwards moving arrangement.

Figure 10:
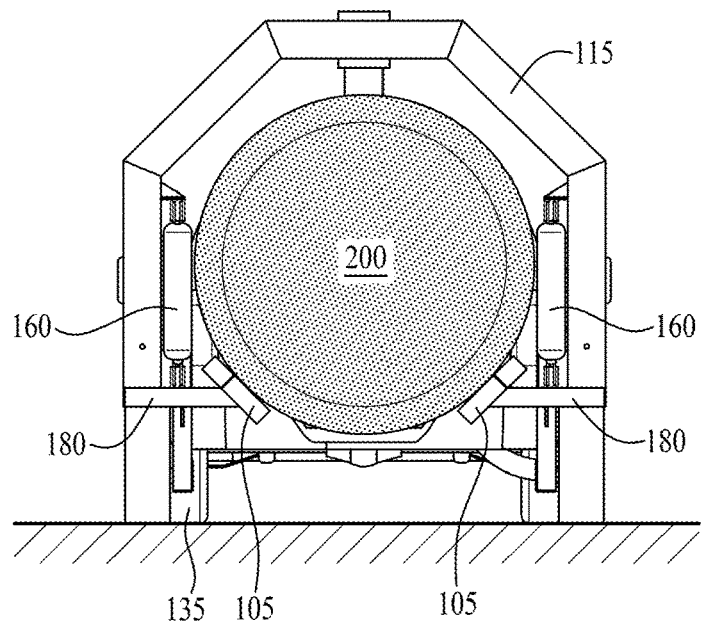
FIG. 10 is a back elevation view of a bale trailer of an illustrative embodiment in a towing position.

FIGS. 8-11 illustrate additional views of trailer 100 in a towing position. As shown in FIGS. 8-11, trailer 100 may be centered behind hauling member 140 so that trailer 100 may be towed. Cradle 110 lifts off and/or away from the ground to carry bales 200 as illustrated in FIG. 10.

Figure 6:
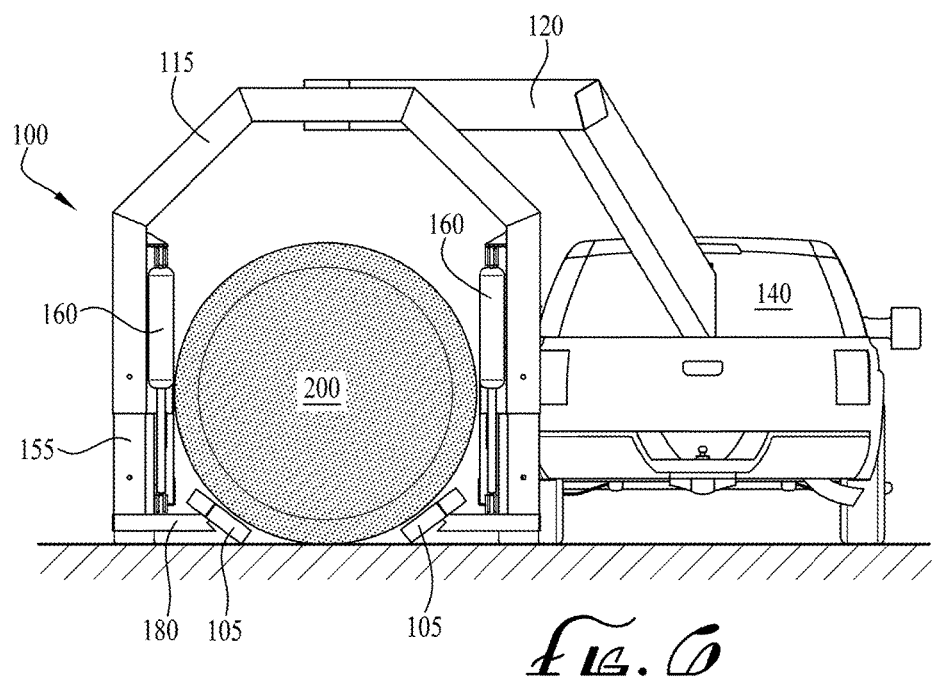
FIG. 6 is a back elevation view of a bale trailer of an illustrative embodiment in a loading position.
Figure 9:
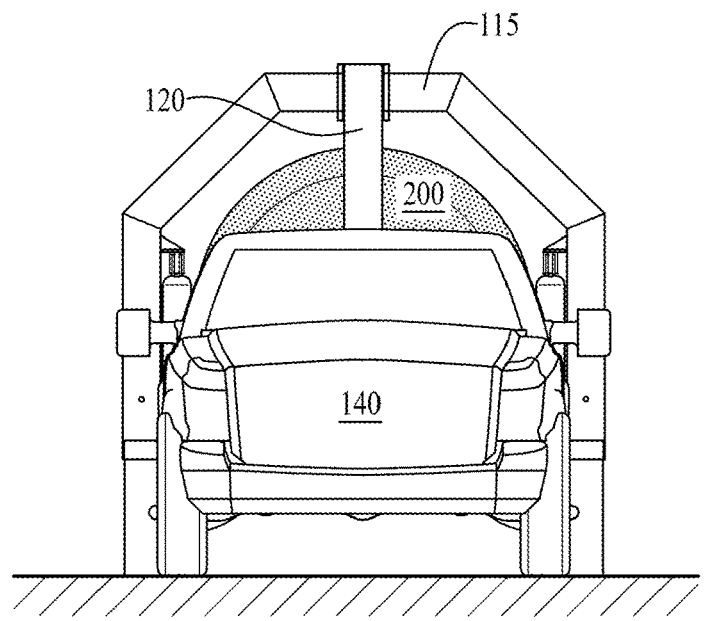
FIG. 9 is a front elevation view of a bale trailer of an illustrative embodiment in a towing position.

Only cradle 110, and not frame 150, may move during transitions between loading/unloading and towing positions and/or during actuation of telescoping support members 155. As telescoping support members 155 extend and retract, skids 105 are lowered or raised. Frame 150 including wheels 135 does not lift or lower. The transition may be best illustrated comparing FIG. 6 to FIG. 10. In FIG. 6, trailer 100 is in a loading/unloading position. Skids 105 are lowered, telescoping support members 155 are elongated, and trailer 100 is askew to the side of hauling member 140. In FIG. 10, trailer 100 is in a transport position, skids 105 are raised, telescoping support members 155 are retracted, and trailer 100 is directly behind hauling member 140.

Gooseneck 120 may pivot the position of trailer 100 with respect to hauling member 140, but gooseneck may not raise or lower or take part in the movement of cradle 110. Moving cradle 110 without frame 150 to load or unload bales 200 provides several advantages. Moving only cradle 110 without frame 150 allows for less moving parts. More moving parts are more places to breakdown in situations where a breakdown would be costly and time consuming. Less moving parts may be easier and faster to operate. Cradle 110 may be easier to control than entire trailer 100. Since actuating members 160 may only lift the weight of bales 200 and skids 105, and not the entire trailer 100, smaller actuating members 160 may be used than would otherwise be required if the entire trailer 100 needed to be lifted. That is turn requires less hydraulic oil volume in hydraulic cylinder embodiments, saves energy and may allow the cradle to move up and down faster than if the entire trailer 100 were moved.

Illustrative embodiments include a method of transporting bales 200. To load bales 200 onto trailer 100, an operator may attach gooseneck 120 to hauling member 140 and drive behind a set of bales 200. Mechanical actuator 165 may then be operated, for example by remote control from the driver's seat of hauling member 140, to pivot and/or hinge trailer 100 to the side of and/or cattycorner to (askew of) hauling member 140 using gooseneck 120, for example as shown in FIG. 4. During pivoting, hauling member 140 may be driven forward to allow positioning of trailer 100.

Actuating members 160 may then be activated, again by remote control, to lower cradle 110 to the ground or just enough to skim the ground with the lowest portion (inner, bottom length) of the slant of skids 105, as for example shown in FIG. 6. In certain embodiments, skids 105 may be marginally off the ground in the lowered position, such that only the bottom of bale 200 rests on the ground. In some loading embodiments, both front and back pairs of telescoping supporting members 155 may be lowered so that the entire length of cradle 110 touches or reaches just above the ground. In certain loading embodiments, only the front or back of the cradle may be lowered, for example as shown in FIG. 13 where the front of cradle 110 has been lowered, but not the back. Hauling member 140 may then be driven forward to scoop bales 200 into cradle 110, as shown in FIG. 12. As each subsequent bale 200 is approached, cradle 110 may be lowered and raised such that as new bales 200 are picked up, previous bales 200 may be forced to slide back on the cradle 110. In some embodiments only the front of cradle 110 may be lowered and raised, such as shown in FIG. 13. Flares 125 may assist in centering bales 200 in cradle 110 as bales are hugged by slanted skids 105. Driving forward to load bales 200 may provide for easier and faster loading procedures as compared to loading when driving backwards. Faster loading procedures may also reduce ground compaction that may cause damage to forage growing in pastures.

In another example, cradle 110 may be lowered and hauling member 140 may be backed-up under the desired number of bales 200 for a feeding run.

Once bales 200 are on skids 105, cradle 110 may be lifted to transport mode (e.g., as high as it will go), for example as shown in FIG. 10, by retracting telescoping support members 155. Trailer 100 may then be pivoted and/or hinged back behind hauling member 140, as shown in FIG. 8.

For transport, hauling member 140 may be driven as is well known to those of skill in the art. In embodiments where hauling member 140 is a truck rather than a tractor, hauling member may be moved more quickly such as at highway speeds, and a tractor and/or other hauling equipment may become free for use for other purposes.

Once hauling member 140 and trailer 100 arrive at a delivery destination, the operator may then determine the number of bales 200 to be delivered at the particular destination. If all bales 200 are to be delivered at a single location, then bales 200 may be unloaded by pivoting trailer 100 askew of hauling member 140, and lowering both front and back pairs of telescoping supporting members 155. When cradle 110 is lowered to the ground, bales 200 may be resting on the ground and skids 105 may no longer be supporting and/or in contact with bales 200. Hauling member 140 may then drive forward such that cradle 110 moves out from under bales 200. This process may be repeated until the windrow is at the desired length and/or the flat sides of bales 200 are protected from the elements.

If on the other hand, only a portion of a load of bales 200 is desired at a particular destination, the operator may lower cradle 110 keeping the front end slightly higher than the back end until the desired number of bales 200 come in contact with the ground at the rear of trailer 100. This may be accomplished by extending telescoping support members 155 at the rear of the trailer rather than, or more than, telescoping support members 155 at the front of trailer 100, creating a ramp. The operator may then drive forward until the bales 200 to be delivered are clear of the cradle 110 skids 105. Delivered bales may then be ready for consumption by the cattle. The operator may next raise cradle 110 to the transport position and proceed to the next pasture and repeat the process until all bales 200 in the load are distributed.

Thus, the invention described herein provides one or more embodiments of an apparatus, system and method for transporting bales. While the invention herein disclosed has been described by means of specific embodiments and applications thereof, numerous modifications and variations could be made thereto by those skilled in the art without departing from the scope of the invention set forth in the claims. The foregoing description is therefore considered in all respects to be illustrative and not restrictive. The scope of the invention is indicated by the appended claims, and all changes that come within the meaning and range of equivalents thereof are intended to be embraced therein.

What is claimed is:

1. A bale trailer comprising:
   a gooseneck that pivotably couples to a hauling member, wherein the gooseneck pivots between a first gooseneck position askew of the hauling member and a second gooseneck position behind the hauling member;
   a frame supportively coupled to the gooseneck and comprising rear wheels;
   a pair of arches, each coupled to the frame by at least two telescoping support members, wherein a first arch of the pair of arches is secured to the gooseneck, and a second arch of the pair of arches is secured behind the rear wheels; and
   a cradle vertically moveable with respect to a longitudinal plane of the frame, the cradle coupled to a bottom side of the at least two telescoping support members of the pair of arches, the cradle comprising at least two tubular elongate skids that either raise or lower together vertically with respect to the frame when at least two telescoping support members of the first arch extend or retract independently of the at least two telescoping support members of the second arch; and
   wherein each of the at least two tubular elongate skids are angled laterally such that the at least two tubular elongate skids support cradle a rounded bale.

2. The bale trailer of claim 1, wherein a first hydraulic cylinder operatively coupled to the gooseneck pivots the gooseneck and a second hydraulic cylinder operatively coupled to the pair of telescoping arches telescopes the at least two telescoping support members.

3. The bale trailer of claim 1, wherein the at least two tubular elongate skids comprise a flare configured to center the rounded bale in the cradle.

4. A system for transporting bales comprising:
a hauling truck;
a trailer pivotably coupled to the hauling truck by a gooseneck, the trailer comprising at least two telescoping arches supported on a frame and suspending a cradle below the at least two telescoping arches, wherein each arch of the at least two telescoping arches are operable independently to move at least one end of the cradle vertically with respect to a longitudinal plane of the frame between:
  a loading position, wherein at least one end of tubular elongate skids at the at least one end of the cradle lowers vertically such that the tubular elongate skids slide into spaces on either side of a round bale in the loading position; and
  a transport position, wherein the at least one end of the tubular elongate skids of the cradle lift the bale off the ground into the transport position; and
wherein the gooseneck pivots the trailer to a driver's side of the hauling truck in the loading position, and wherein the hauling truck loads the bale while moving forward.

5. The system of claim 4, wherein the movement of the cradle and the pivoting of the gooseneck is controlled by a driver of the hauling truck with a remote control.

6. The system of claim 5, wherein hydraulic cylinders move the cradle and the gooseneck in response to the remote control.

7. The system of claim 4, wherein there are a plurality of loading positions defined by extending a first telescoping arch of the telescoping arches to a first length and a second telescoping arch of the telescoping arches to a second length.

8. A method for partially unloading a bale trailer comprising:
transporting a plurality of bales to a delivery location on a bale trailer comprising a cradle, wherein the cradle is moveably attached to a front support arch and a back support arch, and wherein the front and back support arches telescope;
telescoping the front and back support arches independently at the delivery location such that the back support arch is extended more than the front arch and the cradle is angled downwards as judged from the front support arch into an unloading position such that:
  a first at least one bale of the plurality of bales to be delivered at the delivery location contacts a ground; and
  a second at least one bale of the plurality of bales to be further transported does not contact the ground;
moving the bale trailer forward until the first at least one bale of the plurality of bales contacting the ground is clear of the cradle;
retracting the telescoping support arches such that the cradle is raised to a towing position; and
proceeding to a second delivery location with the second at least one bale of the plurality of bales to be further transported.

* * * * *